United States Patent [19]
Kodama et al.

[11] Patent Number: 6,005,556
[45] Date of Patent: Dec. 21, 1999

[54] OPTICAL POINTING DEVICE AND POINTING METHOD USING THE SAME

[75] Inventors: Tomoaki Kodama; Hiroki Yokoyama; Kazuyoshi Hibiya; Hiroyuki Abe, all of Kanagawa-ken, Japan

[73] Assignee: Stanley Electric Co., Ltd., Tokyo, Japan

[21] Appl. No.: 08/943,560

[22] Filed: Oct. 3, 1997

[30] Foreign Application Priority Data

Oct. 7, 1996 [JP] Japan .................................... 8-266134

[51] Int. Cl.⁶ ........................................................ G09G 5/00
[52] U.S. Cl. ............................ 345/175; 345/173; 345/157; 345/179
[58] Field of Search ..................................... 345/173, 174, 345/175, 176, 177, 179, 156, 157, 145, 146, 166; 178/18.01, 18.1

[56] References Cited

U.S. PATENT DOCUMENTS 5,179,369  1/1993  Person et al. .......................... 345/175
5,673,066  9/1997  Toda et al. ............................. 345/157

*Primary Examiner*—Xiao Wu
*Attorney, Agent, or Firm*—Weingarten, Schurgin, Gagnebin & Hayes LLP

[57] ABSTRACT

An optical pointing device for instructing a predetermined operation by moving an index over a display screen of a computer is configured such that a plurality of photocouplers are arranged on vertical sides and horizontal sides of a rectangular operation plane at a predetermined pitch in such a manner that lines of action thereof cross each other at a right angle, coordinates of a first shading pointer contacted to the surface of the operation plane are detected by the photocouplers, coordinates of a second shading pointer contacted to the surface of the operation plane are then detected, and a moving direction is set from the coordinates to move the index. Therefore, a plurality of locations on the surface of the operation plane can be detected by the photocouplers independently, the moving direction can be set from the coordinates of locations where two pointers are placed, and only the moving direction is instructed from the operation plane, thereby making it possible to reduce the size of the pointing device.

7 Claims, 2 Drawing Sheets

OPTICAL POINTING DEVICE AND POINTING METHOD USING THE SAME

BACKGROUND OF THE INVENTION

1. Field of the Invention

This invention relates to an input device for instructing a desired function by moving an index to and aligning it with an icon indicating a printing function on a display screen without inputting characters from a keyboard when printing output, for example, is instructed to a computer.

2. Background Art

A conventional pointing device is such as shown in FIGS. 3 and 4. Shown in FIG. 3 is a pointing device 80 called "mouse" which contains a ball 81 which can rotate in any direction to move an index in all 2-D directions and which is provided with a sensor 82 for detecting the rotational direction and amount of the ball 81 with a magnetic or optical means.

To move the index displayed on a display screen of a computer (not shown), the ball 81 is rotated by moving the pointing device 80 on a flat surface such as the surface of a desk and the sensor 82 which has detected the rotation of the all 81 generates signals corresponding to the rotational direction and amount. Based on the signals, the index displayed on the display screen of the computer is moved to a targeted location.

A pointing deice 90 shown in FIG. 4 is such that two substrates 91 each of which consists of two electrodes 92 laid parallel to each other and a resistor film 93 having a predetermined resistance characteristic and formed between the electrodes 92 are placed one upon the other in such a manner that they cross each other at a right angle and have appropriate spacing between the resistor films 93 thereof.

Since one of the substrates 91 is made from an appropriate flexible member such as a resin film, when a finger is placed on the surface of the pointing device 90 at an arbitrary point and moved to an arbitrary direction, for example, from point P3 to point P4 in the figure, the resistor films 93 contact each other at locations on which the finger is placed sequentially and a predetermined resistance change occurs. This resistance change is calculated by an arithmetic circuit 95, for example, to obtain a moving direction, whereby the index displayed on the display screen of the computer is moved in that calculated direction.

However, in the above-described conventional pointing devices 80 and 90, when the index is to be moved, for example, from an end to an end of the display screen, it must be moved a long distance. A wide area is required on the surface of a desk in the pointing device 80 shown in FIG. 3, or the substrate 91 becomes large in size in the pointing device 90 shown in FIG. 4, resulting in a bulky pointing device.

When the above-described pointing device 80 is operated on a narrow surface of a desk or the pointing device 90 is reduced in size, in order to move the above index a long distance, the pointing device 80 must be moved over the surface of the desk a number of times or the pointing device 90 requires a finger to be placed and moved over the surface of the operation plane a number of times, thus complicating the operation.

When the moving amount of the index over the display screen with respect to the moving amount of the pointing device 80 or the moving amount of the finger over the surface of the pointing device 90 is increased to solve the above problems, operation within a narrow range is possible, but the movement of the index becomes rough, thereby making it difficult to move the index to a targeted location. Solutions to these problems have been awaited.

SUMMARY OF THE INVENTION

As means for solving the above problems of the prior art, the present invention provides an optical pointing device for instructing a predetermined operation by moving an index on a display screen of a computer, wherein a plurality of photocouplers are arranged on vertical and horizontal sides of a rectangular operation plane at a predetermined pitch in such a manner that lines of actions thereof cross each other at a right angle, coordinates of a first shading pointer which is contacted to the surface of the operation plane are detected by the photocouplers, coordinates of a second shading pointer contacted to the surface of the operation plane are then detected, and a moving direction is set from the two coordinates to move the index.

Another aspect of the present invention is to provide a pointing method for instructing a predetermined operation by moving an index over a display screen of a computer, comprising the steps of: cutting a line of action of a pair of photocouplers by pointing with a first pointer a desired position on an operation plane of an optical pointing device having the rectangular operation plane and a plurality of photocouplers arranged on vertical sides and horizontal sides of the operation plane at a predetermined pitch in such a manner that lines of action thereof cross each other at a right angle so as to detect first coordinates; cutting a line of action of a pair of photocouplers by pointing a desired position on the operation plane with a second pointer to detect second coordinates; setting a moving direction of the index from the two detected coordinates by calculation; and moving the index in the set moving direction.

BRIEF DESCRIPTION OF THE DRAWINGS

These objects and advantages of the present invention will become clear from the following description with reference to the accompanying drawings, wherein.

DETAILED DESCRIPTION OF THE PREFERRED EMBODIMENTS

Figure 1:
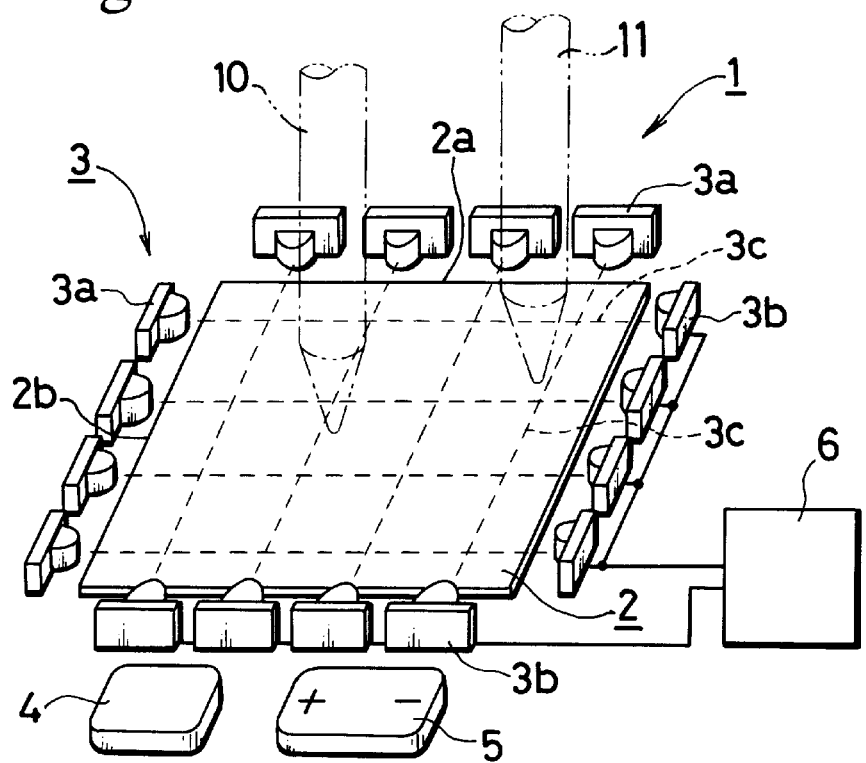
FIG. 1 is a perspective view of an optical pointing device according to an embodiment of the present invention.

The present invention is described in detail with reference to a preferred embodiment shown in the accompanying drawings. Denoted by 1 in FIG. 1 is a an optical pointing device according to the present invention (to be referred to as "pointing device 1" hereinafter). This pointing device 1 comprises a rectangular operation plane 2 having an appropriate size and photocouplers 3. The photocouplers 3 consist of light emitting elements 3a such as LEDs and light receiving elements 3b such as phototransistors.

The arrangement of the operation plane 2 and the photocouplers 3 is described below. First, the operation plane 2 is preferably formed as a rectangular plane having a horizontal side 2a/vertical side 2b ratio of 4:3 so that it becomes similar in shape to the display screen of this type of computers. A ruled pattern or the like is formed for guidance at the time of operation as required by an appropriate means such as printing.

The photocouplers 3 are provided on both the horizontal sides 2a and the vertical sides 2b of the operation plane 2. A plurality of light emitting elements 3a are arranged on one of the horizontal sides 2a at a predetermined pitch, the same number of light receiving elements 3b are arranged on the other horizontal side 2a at the same predetermined pitch. Lines of action 3c between pairs of the light receiving elements 3a and the light emitting elements 3b of the photocouplers 3 should be parallel to the vertical sides 2b.

The photocouplers 3 are also arranged on the vertical sides 2b in the same manner as the horizontal sides 2a. Thereby, the lines of action 3c of the photocouplers 3 arranged on the horizontal sides 2a and the lines of action 3c of the photocouplers 3 arranged on the vertical sides 2b cross each other at a right angle on the surface of the operation plane 2.

When the photocouplers 3 are actually installed, the installation of a large number of light emitting elements 3a on one of the horizontal sides 2a at a precise pitch and the installation of a large number of light receiving elements 3b on the other horizontal side 2a such that they face the light emitting elements 3a are expected to be extremely troublesome. Therefore, an LED array in which a plurality of light emitting portions are formed on a single semiconductor substrate at a predetermined pitch may be used. In this case, a light receiving array in which a plurality of light receiving portions are formed at the same pitch may also be used.

In the constitution of the present invention, when the index is to be moved, which will be described hereinafter, the object of the present invention can be attained by operation within the range of the operation plane 2. Therefore, the pointing device may be formed as a separate unit from a computer (not shown), such as a mouse like the prior art, which is not shown in the accompanying figures, or may be formed integral with the computer.

The pointing device 1 is provided with a click button 4 for inputting the determined position of the index into the computer and a control button 5 for setting the moving speed of the index as required, and further with an arithmetic circuit 6 for calculating the moving direction of the index. The arithmetic circuit 6 may be provided in the computer.

Figure 2:
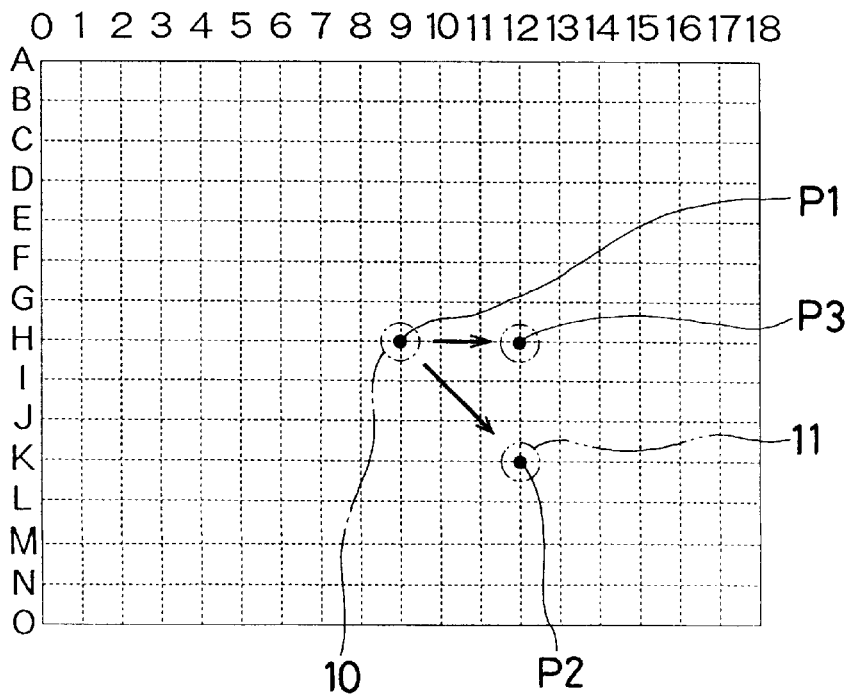
FIG. 2 is a diagram for explaining the use state of the embodiment.
Figure 3:
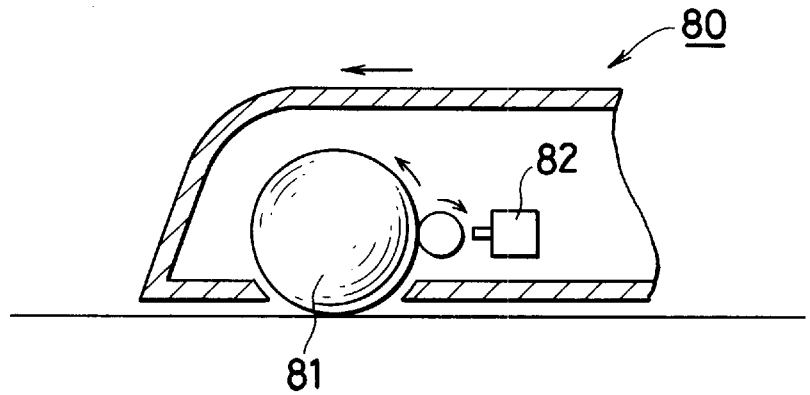
FIG. 3 is a diagram of a prior art.
Figure 4:
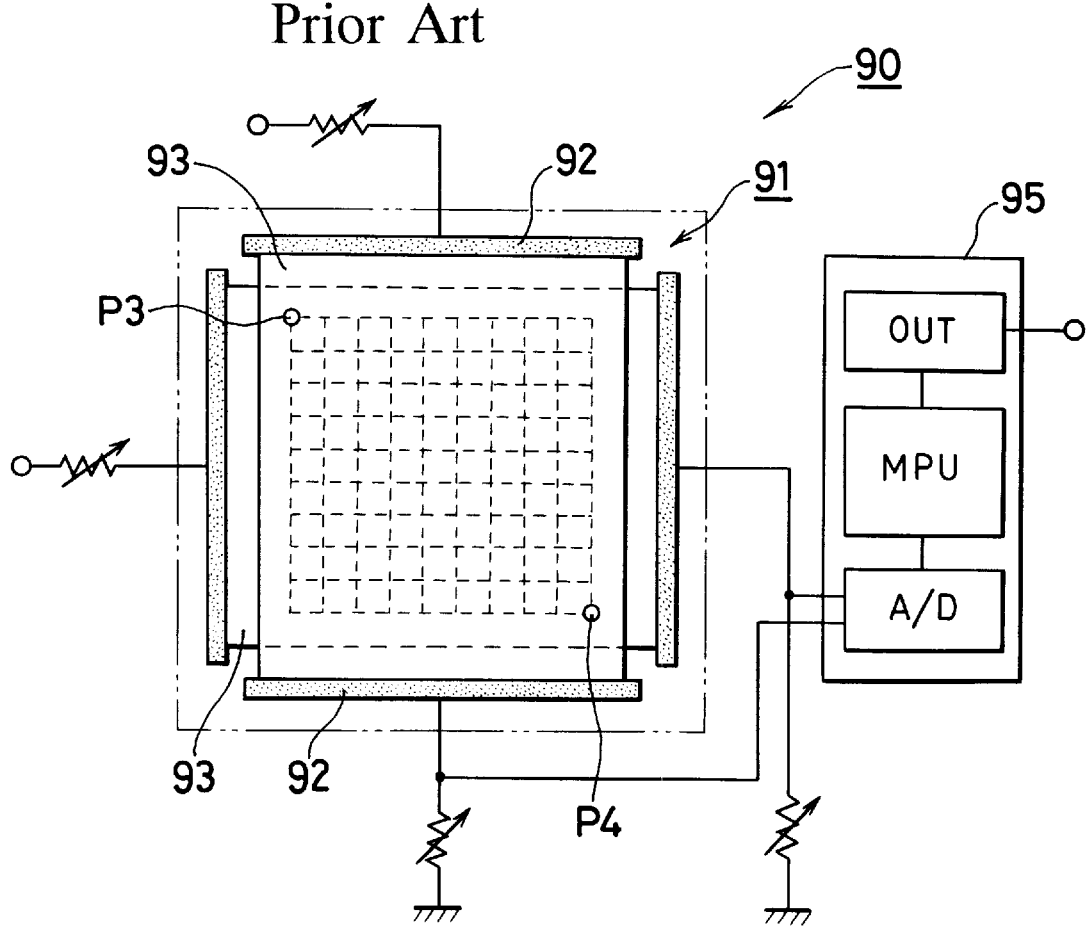
FIG. 4 is a diagram of another prior art.

A description is subsequently given of the function and effect of the pointing device 1 of the present invention which is configured as described above as well as the pointing method of the present invention. When this pointing device 1 is to be used, anything shaped like a stick and having a light shading property, such as a pen or finger, can be used as the pointer. As shown in FIG. 2, the end of a first pointer 10 is preferably contacted to the operation plane 2, preferably the center of the operation plane 2.

Since the first pointer 10 cuts the line of action 3c of any one of the pairs of the photocouplers 3 on the horizontal sides 2a and the line of action 3c of any one of the pairs of the photocouplers 3 on the vertical sides 2b, the coordinates of a point contacted by the first pointer 10 are detected by the arithmetic circuit 6. Stated more specifically, the coordinates of a point P1 contacted by the first pointer 10 are (9, H), for example.

Since the index is displayed on the display screen of the computer at an appropriate location at this point, the first pointer 10 is kept in that state and a second pointer 11 is contacted to the operation plane 2 such that the it indicates the same direction as a direction in which the index is desired to be moved.

When the coordinates of a point P2 contacted by the second pointer 11 at this point are (12, K), for example, the arithmetic circuit 6 calculates the moving direction of the index from the coordinates of P1 contacted by the first pointer 10 and the coordinates of P2 contacted by the second pointer 11 and estimates that the index should be moved down to the right at 45°. Then, the movement of the index in that direction is started at a predetermined moving speed.

If the moving direction of the index over the display screen is not a direction which an operator desires, the operator can move the index to a targeted position by correcting the location contacted by the second pointer 11 (or the first pointer 10). In other words, when the coordinates (12, K) of P2 contacted by the second pointer 11 are changed to the coordinates (12, H) of a point P3, the arithmetic circuit 6 calculates the moving direction again when the change is made to move the index in a right horizontal direction.

When the second pointer 11 is removed from the operation plane 2 as soon as the index reaches the targeted location, only the coordinates of P1 are input into the arithmetic circuit 6 and it is impossible to calculate the moving direction. Therefore, the index is stopped. The index is also stopped by removing the first pointer 10 from the operation plane 2 or by removing both the first pointer 10 and the second pointer 11 from the operation plane 2.

In other words, in the pointing device 1 of the present invention, since a plurality of photocouplers 3 are used, the lines of action thereof are independent from one another, a plurality of locations on the operation plane 2 can be detected independently, only the moving direction is thereby detected from the coordinates of locations where two pointers 10 and 11 are placed, and the index is moved in the detected direction.

Therefore, in the pointing device 1 of the present invention, the moving amount of the index does not need to be instructed but only the moving direction needs to be instructed. Therefore, the operation plane 2 requires an area for enabling the instruction of the moving direction only, thereby making it possible to greatly reduce the size of the pointing device and to eliminate a troublesome operation even when the pointing device is reduced in size.

As described above, according to the present invention, an optical pointing device is configured such that a plurality of photocouplers are arranged on the vertical sides and horizontal sides of a rectangular operation plane at a predetermined pitch in such a manner that the lines of action thereof cross each other at a right angle, the coordinates of a first shading pointer contacted to the surface of the operation plane are detected by the photocouplers, the coordinates of a second shading pointer contacted to the surface of the operation plane are then detected, and a moving direction is set from the two coordinates to move an index. Therefore, a plurality of locations on the operation plane can be detected by the plurality of photocouplers independently, the moving direction is detected from the coordinates of locations where two pointers are placed to move the index, and only the moving direction needs to be instructed, thereby making it possible to reduce the size of the operation plane and to eliminate deterioration in operation ease caused by downsizing. As a result, the practical applicability of this type of pointing device is greatly improved.

What is claimed is:

1. An optical pointing device for instructing a predetermined operation by moving an index over a display screen of a computer, wherein a plurality of photocouplers are arranged on vertical sides and horizontal sides of a rectangular operation plane at a predetermined pitch in such a manner that lines of action thereof cross each other at a right angle;

coordinates of a first shading pointer contacted to the surface of the operation plane are detected by the photocouplers, coordinates of a second shading pointer contacted to the surface of the operation plane are then detected; and a moving direction is set from the coordinates of said first and second shading pointers to move the index.

2. The optical pointing device of claim 1 which comprises an arithmetic circuit for calculating the moving direction from the detected coordinates and setting the moving direction.

3. The optical pointing device of claim 1 which comprises a click button for inputting a determined position of the index.

4. The optical pointing device of claim 1 which comprises a control button for setting a moving speed of the index.

5. The optical pointing device of claim 2 which comprises a click button for inputting a determined position of the index.

6. The optical pointing device of claim 2 which comprises a control button for setting a moving speed of the index.

7. A pointing method for instructing a predetermined operation by moving an index over a display screen of a computer, comprising the steps of:

cutting a line of action of a pair of photocouplers by pointing with a first pointer a desired position on an operation plane of an optical pointing device having the rectangular operation plane and a plurality of photocouplers arranged on vertical sides and horizontal sides of the operation plane at a predetermined pitch in such a manner that lines of action thereof cross each other at a right angle so as to detect first coordinates;

cutting a line of action of a pair of photocouplers by pointing a desired position on the operation plane with a second pointer to detect second coordinates;

setting a moving direction of the index from the first and second detected coordinates by calculation; and moving the index in the set moving direction.

* * * * *